United States Patent
Verdon et al.

[11] 3,908,445
[45] Sept. 30, 1975

[54] ULTRASONIC TRANSDUCER WITH COUPLING MEANS

[75] Inventors: David Charles Verdon; Victor Woodhouse, both of Newport, Wales

[73] Assignee: British Steel Corporation, London, England

[22] Filed: Aug. 17, 1973

[21] Appl. No.: 389,194

[30] Foreign Application Priority Data
Aug. 18, 1972  United Kingdom............... 38701/72

[52] U.S. Cl............................................. 73/71.5 US
[51] Int. Cl.²........................................ G01N 29/00
[58] Field of Search.................... 73/67.5 R, 71.5 U

[56] References Cited
UNITED STATES PATENTS
| | | | |
|---|---|---|---|
| 2,751,783 | 6/1956 | Erdman................... | 73/71.5 UX |
| 3,255,626 | 6/1966 | Van der Veer............ | 73/71.5 U |
| 3,625,051 | 12/1971 | Jozumi..................... | 73/71.5 U |
| 3,745,833 | 7/1973 | Armstrong................ | 73/71.5 UX |

*Primary Examiner*—James J. Gilu
*Attorney, Agent, or Firm*—Bacon & Thomas

[57] ABSTRACT

An apparatus for providing a liquid coupling to a body under test has in sequence within a housing an inlet for receiving coupling liquid from a suitable pressurised source, a diffuser for equalising liquid pressure across the housing section, an arrangement for straightening the flow of liquid within the housing so as to tend to produce laminar flow from an outlet of the housing which is provided with a restriction ensuring positive liquid pressure in the housing. In the case where the apparatus is to be used for coupling an ultrasonic transducer to the body under test by way of the liquid, the transducer is disposed in the housing, preferably downstream of the diffuser so that its active surface comes into contact with the liquid flowing through the housing for incidence upon the body.

7 Claims, 1 Drawing Figure

U.S. Patent  Sept. 30, 1975  3,908,445
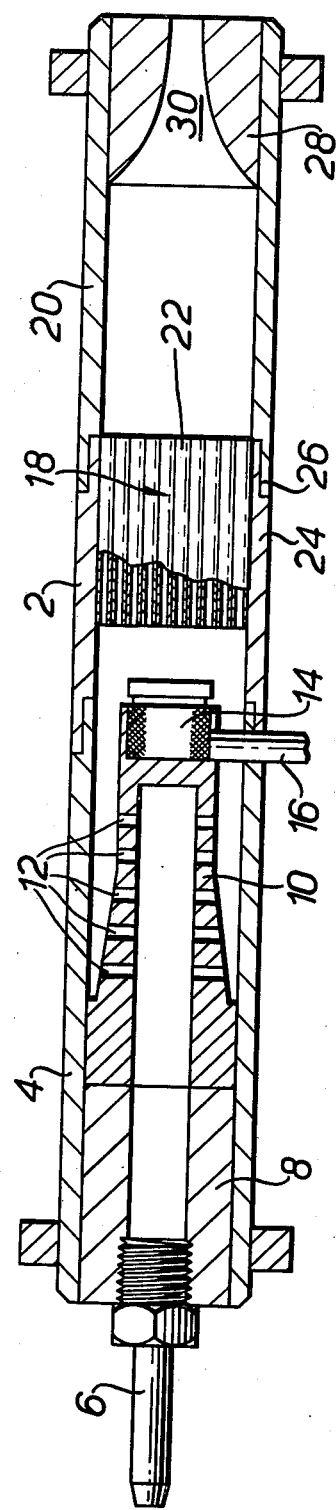

ULTRASONIC TRANSDUCER WITH COUPLING MEANS

According to one aspect of the present invention, apparatus for providing a liquid coupling to a body under test comprises a housing having in sequence an inlet adapted to receive a coupling liquid from a pressurised source, a diffuser for equalising liquid pressure across the housing section, means for straightening the flow of liquid within the housing so as to tend to produce laminar liquid flow from an outlet of the housing which is provided with a restriction ensuring positive liquid pressure within the housing. In the case where the apparatus is intended to couple an ultrasonic transducer to the body, the transducer may be incorporated in the housing, and disposed so that its active surface comes into coupling contact with liquid flowing through the housing for incidence upon the body.

Conveniently the housing is in the form of a sleeve adapted to receive and to eject liquid, at opposite ends respectively.

The diffuser may comprise a membrane which extends over the whole of the housing section and which is provided with apertures providing a suitable restriction to liquid flow.

In a preferred embodiment of the invention, the diffuser comprises a substantially cylindrical member having one closed end and having an open end sealed across the housing section adjacent the inlet. Diffusion is provided by an array of flow restricting apertures provided in the walls of the member and optionally in the closed end.

Suitably, the ultrasonic transducer, which may be of any suitable form well known in the art, is mounted upon or adjacent the closed outer end of a cylindrical diffuser. In this case the diameter of the transducer and the diameter of the cylinder are arranged to be equal so as to present a substantially continuous peripheral surface, tending to reduce to a minimum the onset of turbulence in the liquid flow.

Conveniently, the means for straightening liquid flow comprises any suitable arrangement of members presenting a number of parallel surfaces aligned with the direction of liquid flow. These surfaces will in most cases be aligned with the sleeve or housing axis and will in general extend substantially across the whole of the sleeve or housing section. Such surfaces may be provided by a bundle of relatively thin tubes of adequate length which fill the sleeve section.

The restriction at the outlet end of the sleeve or housing, effective to maintain upstream positive pressure must clearly be such as to disturb as little as possible the substantially laminar flow conditions induced by the flow straightening means. A suitable restriction is in the form of a converging nozzle preferably one having a generally exponential inner surface and positioned for liquid to be discharged from the smaller opening.

An embodiment of the invention will now be particularly described by way of example with reference to the accompanying drawing which shows in axial section a device for coupling an ultrasonic transducer with a body under test.

Referring to the drawing, the device comprises a housing in the form of an outer sleeve 2 having an inlet 4 adapted by way of a coupling 6 to receive water from a suitable positive pressure source. An hollow insert 8 fitted within the end 4 of the sleeve 2 forms an internal conduit for water received by the coupling 6, and terminates in a substantially cylindrical member 10 provided with an array of apertures 12 in its side walls. The number and size of the apertures 12 are arranged to provide such a selective restriction to water flow as tends to equalise water pressure across the section of the sleeve 2 downstream of the cone 10.

An ultrasonic transducer 14 having a suitable integral housing is mounted upon the closed outer end of cylinder 10 so as to present a smooth unbroken peripheral surface tending to reduce to a minimum the incidence of turbulence. The housing of transducer 14 incorporates a duct 16 which extends through the wall of the sleeve 2 and enables water-tight electrical connection to be made to the transducer.

Downstream of the transducer 14, sleeve 2 is provided with flow straightening means indicated generally at 18 for producing substantially laminar flow of water at the outlet end 20 of the sleeve. The flow straightening means comprises a bundle of tubes such as 22 which fill the sleeve section. For the sake of convenience and to ease manufacture the tube bundle 22 is secured to an independent portion 24 of the sleeve which is suitably secured to the adjacent portions by way of the interlocking steps 26.

In order to maintain a positive water pressure within the outlet end of the sleeve 2 and thereby prevent cavitation, the outlet end 20 is provided with a flow restrictor shaped to disturb laminar flow conditions as little as possible. In this embodiment the restrictor comprises a further insert 28 provided with a contoured converging nozzle 30 provididng for an accelerated water velocity at the outlet.

In use, the coupling 6 is connected to a water source having a supply pressure adequate to produce from the converging nozzle 30 a jet of water having substantially laminar flow and of sufficient velocity to reach the body under test. With water flowing through the sleeve and with the transducer operative an effective coupling free of unwanted turbulence is obtained between the transducer and the body. The absence of turbulence avoids interfaces which would otherwise create spurious reflections and improves the signal to noise ratio. The use of the combination of features described enables laminar flow water jets to be obtained of greater length than was possible hitherto and enable ultrasonic tests to be carried out in any attitude and over greater distances. This is of particular advantage in arduous working conditions, for example, during the hot rolling of steel where a relatively large separation between the body under test and the transducer is essential.

It will be appreciated that while one compatible transducer effective selectively to act as transmitter and receiver is shown, two or more transducers, respectively effective to transmit and receive ultrasonic pulses may be incorporated into the apparatus of the invention.

We claim:

1. Apparatus for providing an extended liquid coupling to a body under ultrasonic test, comprising: an elongated housing of substantially tubular internal section incorporating in sequence, an inlet adapted to receive coupling liquid from a pressurized source, a diffuser disposed within said housing and comprising a substantially cylindrical member having one end closed and an outwardly extending annular wall at its other inlet end in engagement with the internal wall of said housing, the side wall of said substantially cylindrical member having a plurality of restrictive apertures extending generally normal to the axis of the interior of said housing for equalising liquid pressure across the housing section downstream of said diffuser, an ultrasonic transducer disposed within the region of the housing downstream of the diffuser, and means for straightening the flow of liquid extending completely across the housing so as to produce laminar flow from an outlet of the housing which is provided with a restriction ensuring positive internal liquid pressure within the portion of the housing disposed inwardly of said outlet, the inlet and outlet being provided at opposite end regions of the housing and in axial alignment, so as to produce within the housing an overall liquid flow which is substantially unidirectional and thereby tend to avoid turbulence induced ultrasonic reflecting interfaces.

2. Apparatus according to claim 1 wherein the outer surface of the diffuser is substantially frusto-conical and the diffuser extends over the frustum.

3. Apparatus for providing an extended liquid coupling to a body under ultrasonic test, comprising: an elongate housing of substantially tubular internal section incorporating in sequence an inlet adapted to receive coupling liquid from a pressurised source, a diffuser having an outer surface of frusto-conical configuration with a plurality of restrictive apertures in the conical wall thereof connecting the interior of said diffuser with said frusto-conical surface for equalising liquid pressure across the housing section downstream of said diffuser, an ultrasonic transducer disposed within the region of the housing downstream of the diffuser, means for straightening the flow of liquid extending completely across the housing so as to produce laminar flow, and an outlet of the housing which is provided with a restriction ensuring positive internal liquid pressure within the portion of the housing disposed inwardly of said outlet, said inlet and outlet being provided at opposite end regions of the housing and in axial alignment so as to produce within the housing an overall liquid flow which is substantially unidirectional and thereby tend to avoid turbulence induced ultrasonic reflecting interfaces.

4. Apparatus according to claim 3 wherein said restrictive apertures extend in a direction substantially normal to the axis of said conical surface.

5. Apparatus according to claim 3 wherein said ultrasonic transducer is carried by the outer end of said diffuser.

6. Apparatus according to claim 5 wherein said ultrasonic transducer is disposed within a recess provided in the outer end of said diffuser.

7. Apparatus according to claim 5 wherein the means for straightening the flow of liquid comprises a bundle of tubes and the axis of each tube is parallel with the axis of said inlet and outlet.

* * * * *